US012566564B2

(12) United States Patent
Gopalakrishnan et al.

(10) Patent No.: US 12,566,564 B2
(45) Date of Patent: Mar. 3, 2026

(54) EFFICIENT USAGE OF REDUNDANT COLUMNS IN FLASH MEMORY

(71) Applicant: WESTERN DIGITAL TECHNOLOGIES, INC., San Jose, CA (US)

(72) Inventors: Raghavendra Gopalakrishnan, Bangalore (IN); Disha Gundecha, Pune (IN)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 8 days.

(21) Appl. No.: 18/237,033

(22) Filed: Aug. 23, 2023

(65) Prior Publication Data

US 2025/0068349 A1      Feb. 27, 2025

(51) Int. Cl.
*G06F 3/06* (2006.01)

(52) U.S. Cl.
CPC .......... *G06F 3/0647* (2013.01); *G06F 3/0604* (2013.01); *G06F 3/064* (2013.01); *G06F 3/0679* (2013.01)

(58) Field of Classification Search
CPC ...... G06F 3/0647; G06F 3/0604; G06F 3/064; G06F 3/0679
See application file for complete search history.

(56) References Cited

U.S. PATENT DOCUMENTS 5,008,816 A * 4/1991 Fogg, Jr. ............. G06F 12/0284
711/E12.013
7,447,066 B2 11/2008 Conley

| | | | |
|---|---|---|---|
| 9,229,854 B1 * | 1/2016 | Kuzmin | ................ G06F 3/0679 |
| 9,748,001 B2 | 8/2017 | Li | |
| 10,089,177 B2 | 10/2018 | Bazarsky | |
| 10,860,228 B1 | 12/2020 | Mulani | |
| 11,004,535 B1 | 5/2021 | Hsu | |
| 11,152,079 B2 | 10/2021 | Bassa | |
| 2012/0051162 A1 * | 3/2012 | Lin | ......................... G11C 29/44 |
| | | | 365/200 |
| 2016/0071608 A1 * | 3/2016 | Bronner | ............. G11C 16/3418 |
| | | | 365/185.18 |
| 2020/0210376 A1 * | 7/2020 | Vaideeswaran | ..... G06F 11/0727 |
| 2022/0066926 A1 * | 3/2022 | D'Eliseo | ............. G06F 12/0253 |

* cited by examiner

*Primary Examiner* — Hosain T Alam
*Assistant Examiner* — Subir Kumar Chowdhury
(74) *Attorney, Agent, or Firm* — Arlene Neal; NEAL BLIBO LLC

(57) ABSTRACT

A storage device may use unused bits in a memory device communicatively coupled to the storage device to reduce resource usage and time on the storage device during background operations. The memory device includes a plane having a redundant column section including unused bits. When the storage device receives instructions from a host device, a controller on the storage device may determine that the instructions are associated with data to be discarded from the memory device and may associate the data to be discarded with fragments in the memory device. The controller may generate relocation information, associate the relocation information with data stored in the memory device, and store the relocation information in the unused bits. During relocation operations, the controller may use the relocation information to determine whether fragments in the memory device include the data to be discarded and/or whether to move data in the memory device.

20 Claims, 8 Drawing Sheets

100

| FMU 0 208 | FMU 1 208 | FMU 2 208 | FMU 3 208 | ECC 304 | CRD 306 |
|---|---|---|---|---|---|
| PAYLOAD 302 | | | | | |
| PLANE 202 | | | | | |

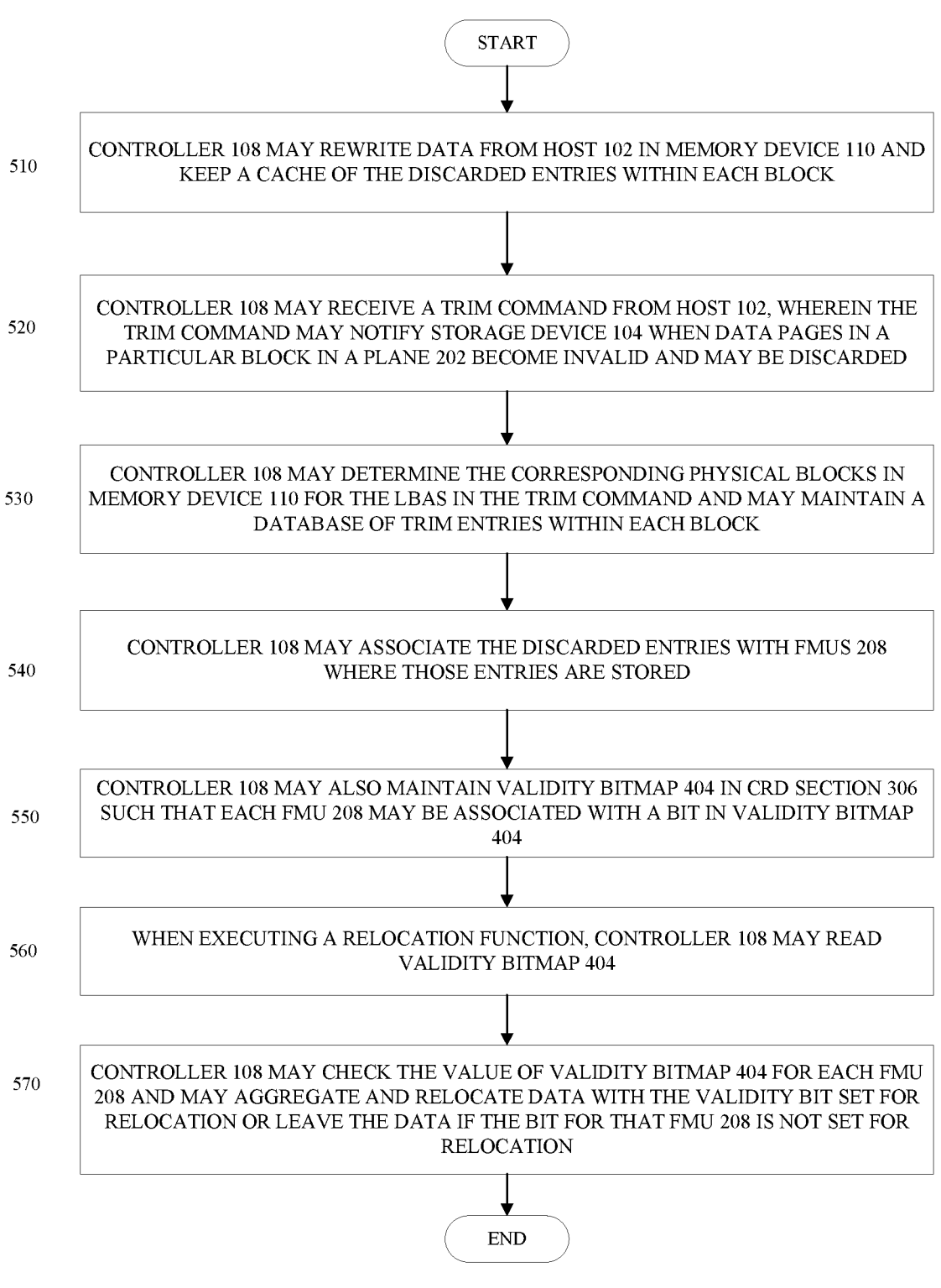

START

510    CONTROLLER 108 MAY REWRITE DATA FROM HOST 102 IN MEMORY DEVICE 110 AND KEEP A CACHE OF THE DISCARDED ENTRIES WITHIN EACH BLOCK

520    CONTROLLER 108 MAY RECEIVE A TRIM COMMAND FROM HOST 102, WHEREIN THE TRIM COMMAND MAY NOTIFY STORAGE DEVICE 104 WHEN DATA PAGES IN A PARTICULAR BLOCK IN A PLANE 202 BECOME INVALID AND MAY BE DISCARDED

530    CONTROLLER 108 MAY DETERMINE THE CORRESPONDING PHYSICAL BLOCKS IN MEMORY DEVICE 110 FOR THE LBAS IN THE TRIM COMMAND AND MAY MAINTAIN A DATABASE OF TRIM ENTRIES WITHIN EACH BLOCK

540    CONTROLLER 108 MAY ASSOCIATE THE DISCARDED ENTRIES WITH FMUS 208 WHERE THOSE ENTRIES ARE STORED

550    CONTROLLER 108 MAY ALSO MAINTAIN VALIDITY BITMAP 404 IN CRD SECTION 306 SUCH THAT EACH FMU 208 MAY BE ASSOCIATED WITH A BIT IN VALIDITY BITMAP 404

560    WHEN EXECUTING A RELOCATION FUNCTION, CONTROLLER 108 MAY READ VALIDITY BITMAP 404

570    CONTROLLER 108 MAY CHECK THE VALUE OF VALIDITY BITMAP 404 FOR EACH FMU 208 AND MAY AGGREGATE AND RELOCATE DATA WITH THE VALIDITY BIT SET FOR RELOCATION OR LEAVE THE DATA IF THE BIT FOR THAT FMU 208 IS NOT SET FOR RELOCATION

END

FIG. 5

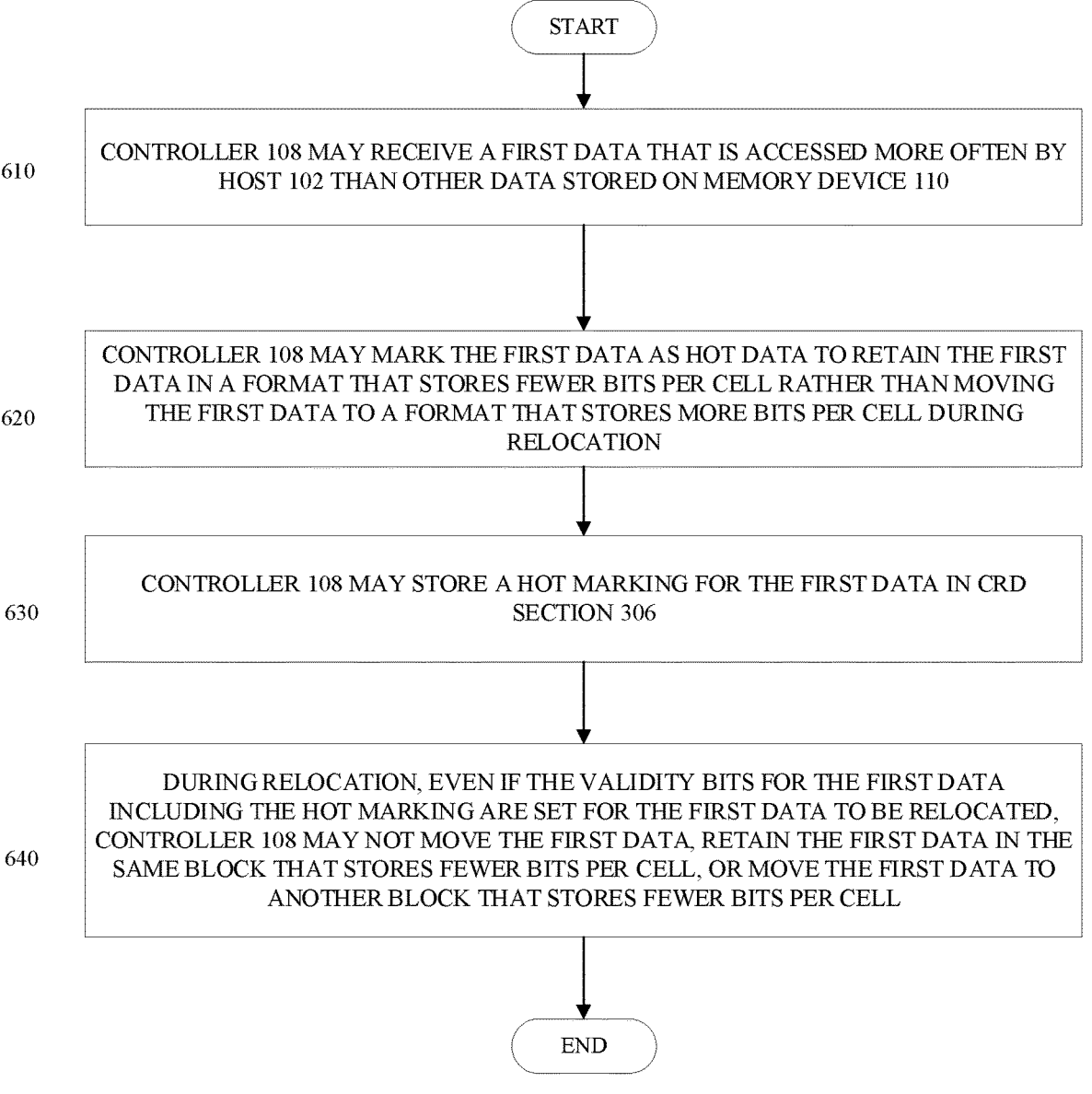

START

610 CONTROLLER 108 MAY RECEIVE A FIRST DATA THAT IS ACCESSED MORE OFTEN BY HOST 102 THAN OTHER DATA STORED ON MEMORY DEVICE 110

620 CONTROLLER 108 MAY MARK THE FIRST DATA AS HOT DATA TO RETAIN THE FIRST DATA IN A FORMAT THAT STORES FEWER BITS PER CELL RATHER THAN MOVING THE FIRST DATA TO A FORMAT THAT STORES MORE BITS PER CELL DURING RELOCATION

630 CONTROLLER 108 MAY STORE A HOT MARKING FOR THE FIRST DATA IN CRD SECTION 306

640 DURING RELOCATION, EVEN IF THE VALIDITY BITS FOR THE FIRST DATA INCLUDING THE HOT MARKING ARE SET FOR THE FIRST DATA TO BE RELOCATED, CONTROLLER 108 MAY NOT MOVE THE FIRST DATA, RETAIN THE FIRST DATA IN THE SAME BLOCK THAT STORES FEWER BITS PER CELL, OR MOVE THE FIRST DATA TO ANOTHER BLOCK THAT STORES FEWER BITS PER CELL

END

FIG. 6

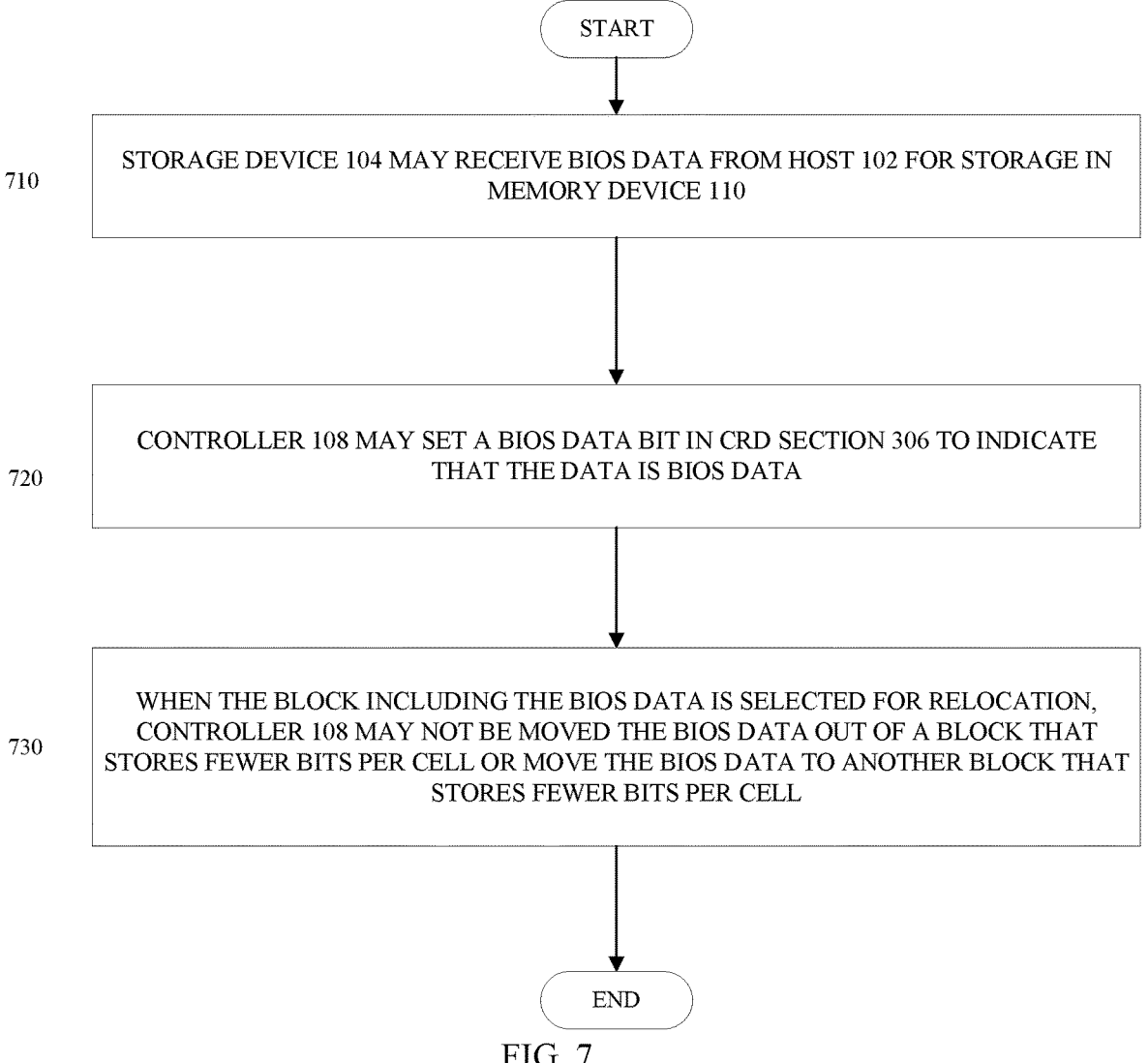

START

710  STORAGE DEVICE 104 MAY RECEIVE BIOS DATA FROM HOST 102 FOR STORAGE IN MEMORY DEVICE 110

720  CONTROLLER 108 MAY SET A BIOS DATA BIT IN CRD SECTION 306 TO INDICATE THAT THE DATA IS BIOS DATA

730  WHEN THE BLOCK INCLUDING THE BIOS DATA IS SELECTED FOR RELOCATION, CONTROLLER 108 MAY NOT BE MOVED THE BIOS DATA OUT OF A BLOCK THAT STORES FEWER BITS PER CELL OR MOVE THE BIOS DATA TO ANOTHER BLOCK THAT STORES FEWER BITS PER CELL

END

EFFICIENT USAGE OF REDUNDANT COLUMNS IN FLASH MEMORY

BACKGROUND

Non-volatile storage devices, such as solid-state drives (SSD) and the like, may include one or more memory devices for storing data and a controller for managing the internal operations of the storage device. The controller may process background operations including, for example, executing internal operations to manage the resources on the storage device. In managing the resources of the storage device, the controller may execute relocation functions including compaction, read scrubbing, wear leveling, garbage collection, and the like, to move data from one location to another on the memory device, optimize how space on the memory device is used, and improve efficiency.

The memory device may be divided into blocks, wherein blocks in the memory device may be grouped together into a plane. A flash die may include one or more planes that have been linked together. The number and configurations of planes within the flash die may be adaptable. Multiple dies may also be configured to form a meta die.

Logic on the memory device may divide the bits in a plane into sections such that a plane may include a payload section, where data is stored. In an exemplary plane, the payload section may store about sixteen kilobytes (KB) of data. The plane may also include an error-correction code (ECC) section that is associated with the payload section. ECC bytes in the ECC section may be used to correct errors in the payload content. The plane may further include a redundant column section with extra bits/columns that may be used to replace damaged/bad columns in the payload and/or ECC sections. If the payload and/or ECC sections do not have bits that need to be replaced with the bits in the redundant column section, the bits in the redundant column section may remain unused, thus limiting the efficient use of resources on the memory device.

SUMMARY

In some implementations, a storage device uses unused bits on a memory device for background operations to reduce resource usage and time on the storage device during background operations. The storage device is communicatively coupled to a host device that reads data from and writes data to the memory device which is also communicatively coupled to the storage device. The memory device may include a plane having a redundant column section including unused bits. A controller in the storage device may receive instructions from the host device and determine that the instructions are associated with data to be discarded from the memory device and may associate the data to be discarded with fragments in the memory device. The controller may generate relocation information, associate the relocation information with data stored in the memory device, and store the relocation information in the redundant column section. During relocation operations, the controller may use the relocation information to determine whether fragments in the memory device include the data to be discarded and whether to move data in the memory device.

In some implementations, a method is provided for reducing resource usage and time on the storage device when executing background operations on a storage device. The method includes receiving instructions from a host device by the storage device and determining, by a processor in the storage device, that the instructions are associated with data to be discarded from the memory device. The method also includes associating the data to be discarded with fragments in the memory device, generating, relocation information, and associating the relocation information with data stored in the memory device. The method further includes storing the relocation information in unused bits in a redundant column section in a plane on a memory device communicatively coupled to the storage device and using the relocation information to determine whether fragments in the memory device include the data to be discarded and whether to move data in the memory device when executing a relocation operation.

In some implementations, the storage device is communicatively coupled to a memory device that includes a plane having a redundant column section. The redundant column section includes bits for use as replacement bits in the plane. The storage device uses the remaining bits in the redundant column section, not used as replacement bits, for background operations to reduce resource usage and time on the storage device during background operations.

BRIEF DESCRIPTION OF THE SEVERAL VIEWS OF THE DRAWINGS

FIG. 5 is a flow diagram of an example process for improving performance on a storage device during a relocation operation by using redundant columns in a plane in accordance with some implementations.

FIG. 6 is a flow diagram of an example process for improving performance on a storage device retrieving hot data in accordance with some implementations.

FIG. 7 is a flow diagram of an example process for improving performance on a storage device storing bios data in accordance with some implementations.

Figure 1:
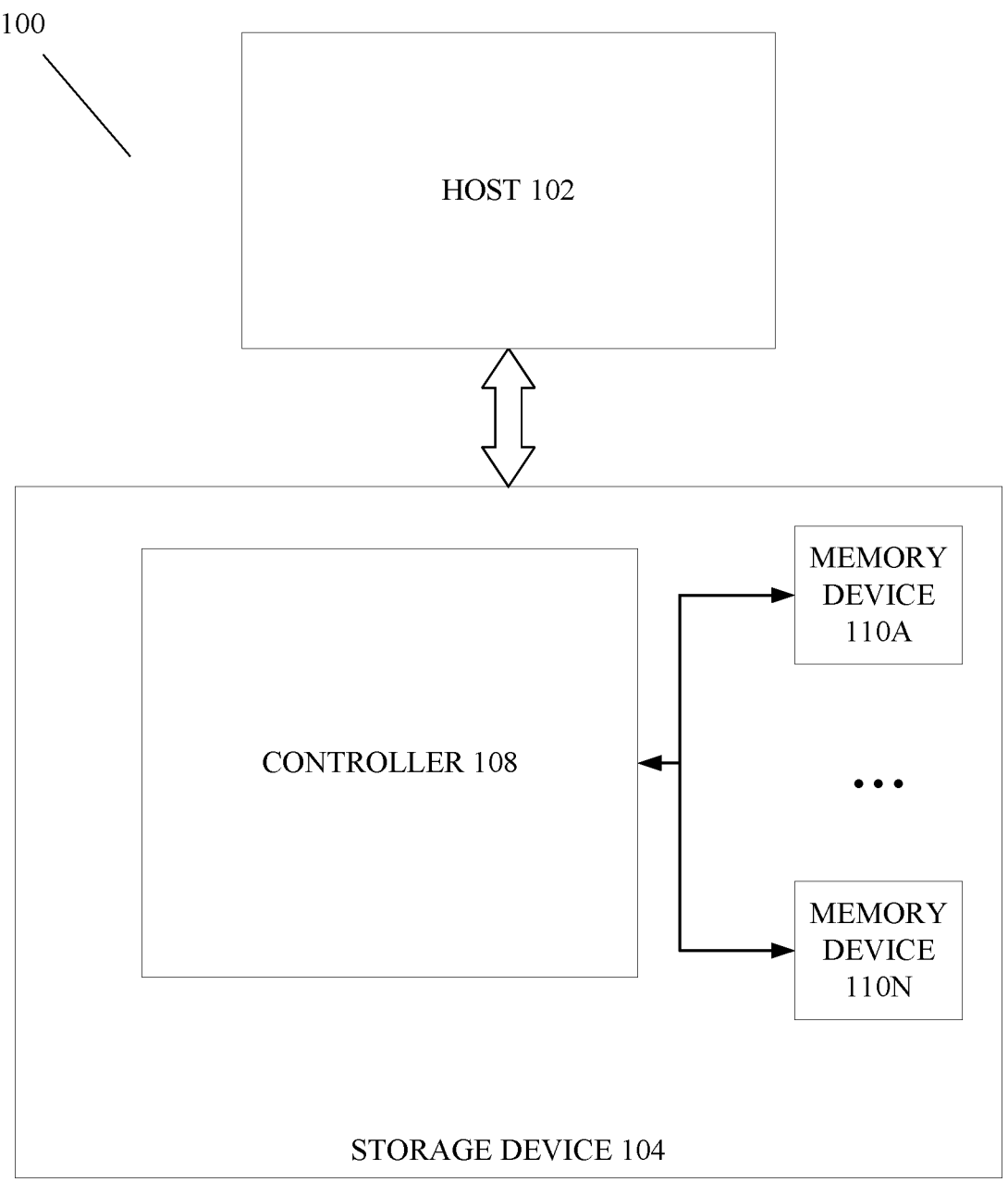
FIG. 1 is a schematic block diagram of an example system in accordance with some implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements.

FIG. 1 is a schematic block diagram of an example system in accordance with some implementations. System 100 includes a host 102 and a storage device 104. Host 102 may transmit commands to read or write data to storage device 104. Host 102 and storage device 104 may be in the same physical location as components on a single computing device or on different computing devices that are communicatively coupled. Storage device 104, in various embodiments, may be disposed in one or more different locations relative to the host 102. Host 102 may include additional components (not shown in this figure for the sake of simplicity).

Storage device 104 may include a controller 108 and one or more memory devices 110a-110n (referred to herein as memory device(s) 110). Storage device 104 may be, for example, a solid-state drive (SSD), and the like. Controller 108 may execute background operations to manage resources on memory device 110. For example, controller 108 may monitor memory device 110 and may execute garbage collection and other relocation functions per internal relocation algorithms to refresh and/or relocate the data on memory device 110.

Memory device 110 may be flash based, including, for example, NAND flash memory. Memory device 110 may be included in storage device 104 or may be otherwise communicatively coupled to storage device 104. Data may be stored on memory device 110 in various formats, with the formats being defined by the number of bits that may be stored per memory cell. For example, a single-layer cell (SLC) format may write one bit of information per memory cell, a multi-layer (MLC) format may write two bits of information per memory cell, a triple-layer (TLC) format may write three bits of information per memory cell, and a quadruple-layer cell (QLC) format may write four bits of information per memory cell, and so on. Formats storing fewer bits in each cell are more easily accessed, durable, and less error-prone than formats storing more bits per cell. However, formats storing fewer bits in each cell are also more expensive.

To increase performance, controller 108 may program data in a format storing fewer bits in each memory cell. Subsequently, when performing background operations, controller 108 may program/fold the data from the format storing fewer bits in each memory cell into a format storing more bits in each memory cell, thus allowing the data to be stored more compactly and enabling memory device 110 to store more data. For example, controller 108 may fold SLC data to MLC data.

Controller 108 may also process foreground operations including instructions transmitted from host 102. For example, controller 108 may read data from and/or write data to memory device 110 based on instructions received from host 102. Controller 108 may store data in blocks of a fixed size on memory device 110 and may address the data using logical block addresses (LBAs) sent from host 102. The LBAs may be mapped one-to-one to physical addresses on memory device 110. The one-to-one LBA to physical address mappings may be stored in a logical-to-physical (L2P) table. When host 102 transmits data to be written to memory device 110, host 102 may associate one or more logical block addresses with the data, wherein each logical block address may be associated with a sector of, for example, 512 bytes.

When storage device 104 receives a write command from host 102, storage device 104 may perform fragmenting on the data by breaking up or accumulating the host data into uniform-sized fragments before sending the data to memory device 110. For example, depending on the configuration of storage device 104, the data may be divided into fragments (Flash Management Units (FMUs)) of, for example, 4 Kilobytes (KB). Fragmenting of the data may aid in mapping the logical addresses associated with the host data to physical addresses in memory device 110. Storage device 104 may use the mappings to store data and access/retrieve the data from memory device 110.

Storage device 104 may perform these processes based on a processor, for example, controller 108 executing software instructions stored by a non-transitory computer-readable medium, such as storage component 110. As used herein, the term "computer-readable medium" refers to a non-transitory memory device. Software instructions may be read into storage component 110 from another computer-readable medium or from another device. When executed, software instructions stored in storage component 110 may cause controller 108 to perform one or more processes described herein. Additionally, or alternatively, hardware circuitry may be used in place of or in combination with software instructions to perform one or more processes described herein. Thus, implementations described herein are not limited to any specific combination of hardware circuitry and software. System 100 may include additional components (not shown in this figure for the sake of simplicity). FIG. 1 is provided as an example. Other examples may differ from what is described in FIG. 1.

Figures 2, 3:
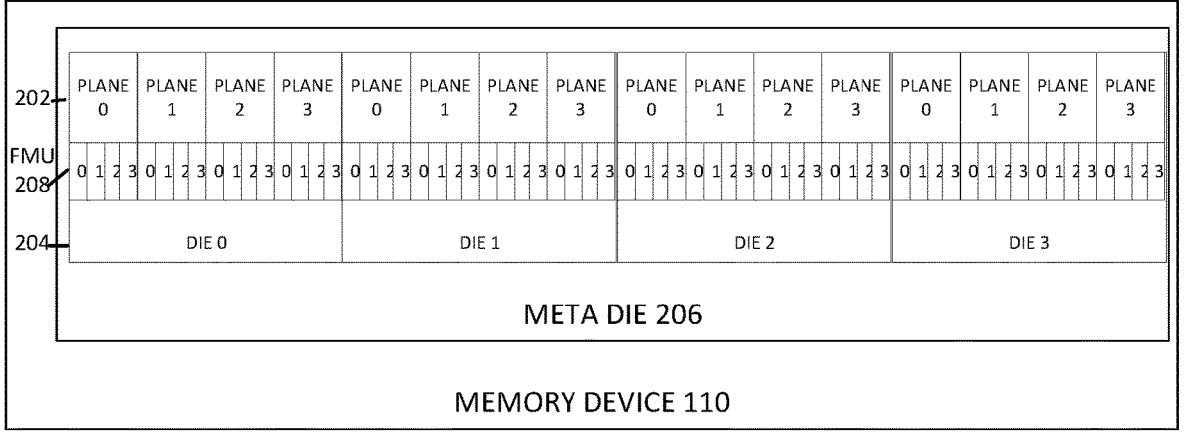
FIG. 2 is a block diagram of an exemplary memory device used in accordance with some implementations.
FIG. 3 is a block diagram of an exemplary plane used in accordance with some implementations.

FIG. 2 is a block diagram of an exemplary memory device used in accordance with some implementations. Memory device 110 may be divided into blocks, which may be further divided into pages. Data may be read and written at the page level but is erased at the block level. Blocks in memory device 110 may be grouped together into a plane 202, shown as exemplary planes 0-3. Dies 204, shown as exemplary dies 0-3, may include one or more planes 202 that have been linked together. The number and configurations of planes 202 within die 204 may be adaptable. Multiple dies 204 may also be configured to form a meta die 206. FIG. 2 is provided as an example. Other examples may differ from what is described in FIG. 2.

FIG. 3 is a block diagram of an exemplary plane used in accordance with some implementations. The bits in plane 202 may be divided into sections such that plane 202 may include a payload section 302, an error-correction code (ECC) section 304, and a redundant column (CRD) section 306. Data may be stored in payload section 302. In an exemplary plane, payload section 302 may store about sixteen kilobytes (KB) of data which may be divided to store four FMUs 208, shown as exemplary FMUs 0-3. ECC section 304 may include 2592 bytes that may be used to store error correction bits. Information in ECC section 304 may be associated with payload section 302. CRD section 306 may include 142 extra bytes that may be used to replace damaged bits/columns in payload section 302 and/or ECC section 304. FIG. 3 is provided as an example. Other examples may differ from what is described in FIG. 3.

Figure 4:
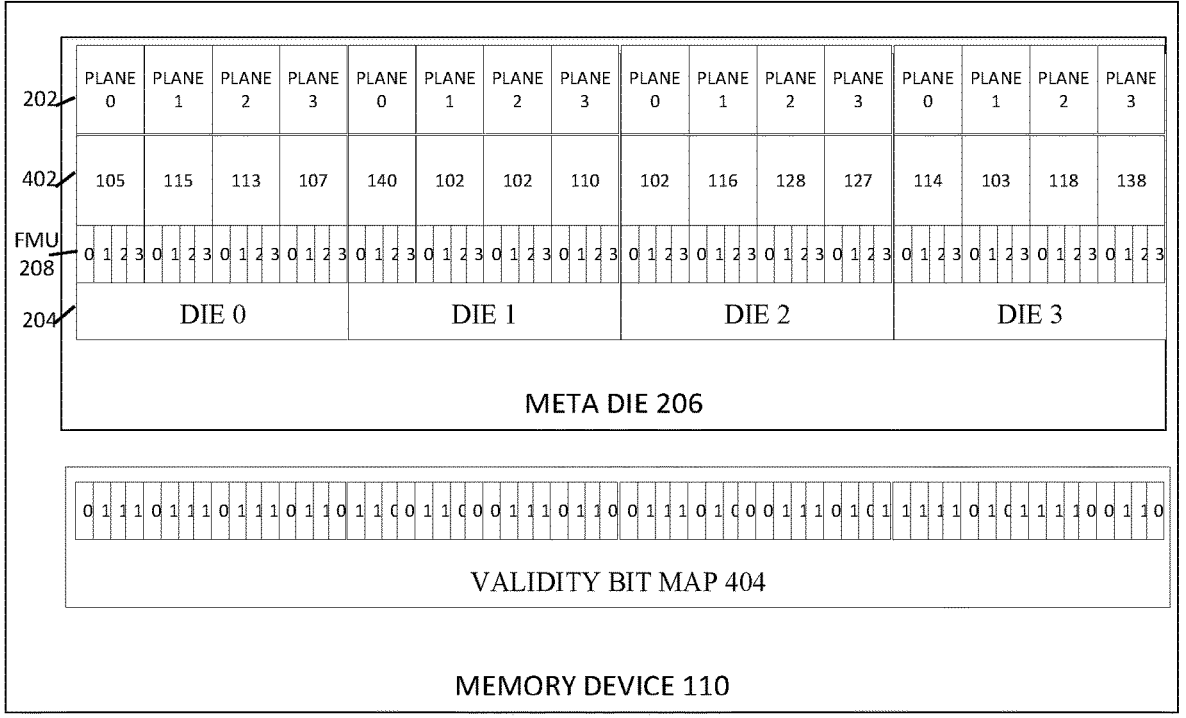
FIG. 4 is another block diagram of an exemplary memory device used in accordance with some implementations.

FIG. 4 is another block diagram of an exemplary memory device used in accordance with some implementations. After replacing bad columns in payload section 302 and/or ECC section 304, each plane 202 may have a different number of remaining/free redundant bits in CRD section 306. The bits for a plane are shown as redundant bits 402 in FIG. 4. Controller 108 may use these free redundant columns in CRD section 306 for background operations.

Controller 108 may perform relocation functions to manage the resources on memory device 110. In current systems, for an FMU 208 in plane 202, controller 108 may read the header to obtain the LBA information for the FMU 208. Controller 108 may translate the FMU 208 header and read the L2P table. If there is a match between the L2P table and the translation, controller 108 may determine that the data in the associated FMU 208 is valid and move the data when executing relocation functions. If there is no match between the L2P table and the translation, controller 108 may determine that the associated FMU 208 includes invalid content and may not move the data in the associated FMU when executing relocation functions. Translating the header, reading the L2P table, and comparing the header in the L2P table is a costly operation in terms of the usage of storage device 104 resources and the time associated with executing relocation functions.

In some implementations, data from host 102 may be rewritten in memory device 110. Controller 108 may keep a cache of the rewritten (discarded) entries within each block. Host 102 may also send a TRIM command to storage device 104 to preemptively notify storage device 104 when data pages in a particular block in plane 202 become invalid and may be erased/discarded (i.e., the data may not be moved during relocation). The TRIM command may include the LBAs that are associated with the data pages to be erased. To efficiently execute relocation functions, controller 108 may determine the corresponding physical blocks in memory device 110 for the LBAs in the TRIM sent from host 102 and may maintain a database of TRIM entries within each block. Controller 108 may associate the discarded entries (whether from the TRIM command or entries that are associated with rewritten host data) with the FMUs 208 where those entries are stored.

Controller 108 may also maintain a validity bitmap 404 such that an FMU 208 may be associated with a bit in validity bitmap 404. Using the exemplary memory device of FIG. 4, controller 108 may set four bits in validity bitmap 404 for a plane 202 with four FMUs, i.e., sixteen bits in validity bitmap 404 for die 204 with four planes 202 and sixty-four bits in validity bitmap 404 for meta die 206 with four dies 204. Controller 108 may set the bit for FMUs 208 associated with entries to be discarded to a first value, for example, 0, and the bit for FMUs 208 associated with entries to be relocated to a second value, for example, 1. Controller 108 may store validity bitmap 404 in CRD section 306 of plane 202.

When executing a relocation function such as garbage collection, controller 108 may read validity bitmap 404 stored in the CRD section 306 rather than reading each FMU header, performing translation, and comparing the translation to the L2P table. Controller 108 may check the value of validity bitmap 404 for FMU 208 and may aggregate data with the validity bit set to the second value for relocation or leave the data if the bit for that FMU 208 is set to the first value. Validity bitmap 404 may thus allow controller 108 to conserve the resources previously used for LBA translations, retrieval of the L2P, and comparison of the LBA translations with the L2P and may improve the performance of storage device 104 during a relocation operation.

In some cases, host 102 may read a particular set of data from memory device 110 more often than other data. For example, host 102 may read a File Allocation Table (FAT) or other cached data (referred to herein as first data) more often than other data stored in memory device 110 and referred to herein as second data. Controller 108 may mark the first data with a hot data flag to determine how to move the associated data during a relocation operation. For example, during a relocation operation, controller 108 may retain the first data in a format using fewer bits per cell, for example, an SLC or hybrid SLC (hSLC) format rather than moving the first data to, for example, MLC, TLC, or QLC format. Controller 108 may store the hot data flag for the first data in CRD section 306. During relocation, even if the validity bits are set for the first data to be relocated, because the first data is also associated with the hot data flag, controller 108 may not move the first data and may retain the first data in the same SLC/hSLC block, or move the first data to another block having the same number of bits per cell format (i.e., another SLC/hSLC block). As such, controller 108 may retain the first data in a format requiring fewer bits per cell, such as the SLC/hSLC format.

In some cases, host 102 may offload bios data, for example, boot or Replay Protected Memory Block (RPMB) data to memory device 110. Host 102 may read the bios data from memory device 110 when host 102 is being initialized/powered on. When host 102 sends the bios data to storage device 104, controller 108 may set a bios data bit in CRD section 306 to indicate that the data is bios data. So, when the block including the bios data is selected for relocation, controller 108 may not be moved the bios data out of, for example, an hSLC/SLC partition because of the set bios data bit or may move the bios data to another block having the same number of bits per cell format (i.e., another SLC/hSLC block).

Controller 108 may write data to CRD section 306 using an error correcting code, for example, Golay code in [24, 12,8] format covering 3-bit failures in 12-bit code word with a block length of 24 bits. Controller 108 may also write data to CRD section 306 using data/data-bar pairs (i.e., storing the data and a complement of the code word in pairs) with cyclic redundancy code (CRC) check to verify the content. Controller 108 may also write data to CRD section 306 using Triple Module Redundancy (TMR) with a CRC kind of mechanism which may drive the validity of the content based on a majority rule. The CRC may verify the content, and redundancy may correct any bit errors.

Depending on the number of free redundant bits 402, controller 108 may program/adjust how the free redundant bits 402 are used during background operations. For example, depending on the number of free redundant bits 402, controller 108 may generate/use the validity bitmap, the hot data flag and/or the bios data bit. FIG. 4 is provided as an example. Other examples may differ from what is described in FIG. 4.

FIG. 5 is a flow diagram of an example process for improving performance on a storage device during a relocation operation by using redundant columns in a plane in accordance with some implementations. At 510, controller 108 may rewrite data from host 102 in memory device 110 and keep a cache of the discarded entries within each block. At 520, controller 108 may receive a TRIM command from host 102, wherein the TRIM command may notify storage device 104 when data pages in a particular block in plane 202 become invalid and may be discarded. At 530, controller 108 may determine the corresponding physical blocks in memory device 110 for the LBAs in the TRIM command and may maintain a database of TRIM entries within each block. At 540, controller 108 may associate the discarded entries with FMUs 208 where those entries are stored.

At 550, controller 108 may also maintain validity bitmap 404 in CRD section 306 such that each FMU 208 may be associated with a bit in validity bitmap 404. At 560, when executing a relocation function, controller 108 may read validity bitmap 404. At 570, controller 108 may check the value of validity bitmap 404 for each FMU 208 and may aggregate and relocate data with the validity bit set for relation or leave the data if the bit for that FMU 208 is not set for relocation. FIG. 5 is provided as an example. Other examples may differ from what is described in FIG. 5.

FIG. 6 is a flow diagram of an example process for improving performance on a storage device retrieving hot data in accordance with some implementations. At 610, controller 108 may receive a first data that is accessed more often by host 102 than other data stored on memory device 110. At 620, controller 108 may mark the first data as hot data to retain the first data in a format that stores fewer bits per cell rather than moving the first data to a format that stores more bits per cell during relocation. At 630, controller 108 may store a hot marking for the first data in CRD section 306. At 640, during relocation, even if the validity bits for the first data including the hot marking are set for the first data to be relocated, controller 108 may not move the first data, retain the first data in the same block that stores fewer bits per cell, or move the first data to another block that stores fewer bits per cell. FIG. 6 is provided as an example. Other examples may differ from what is described in FIG. 6.

FIG. 7 is a flow diagram of an example process for improving performance on a storage device storing bios data in accordance with some implementations. At 710, storage device 104 may receive bios data from host 102 for storage in memory device 110. At 720, controller 108 may set a bios data bit in CRD section 306 to indicate that the data is bios data. At 730, when the block including the bios data is selected for relocation, controller 108 may not be moved the bios data out of a block that stores fewer bits per cell or move the bios data to another block that stores fewer bits per cell. FIG. 7 is provided as an example. Other examples may differ from what is described in FIG. 7.

Figure 8:
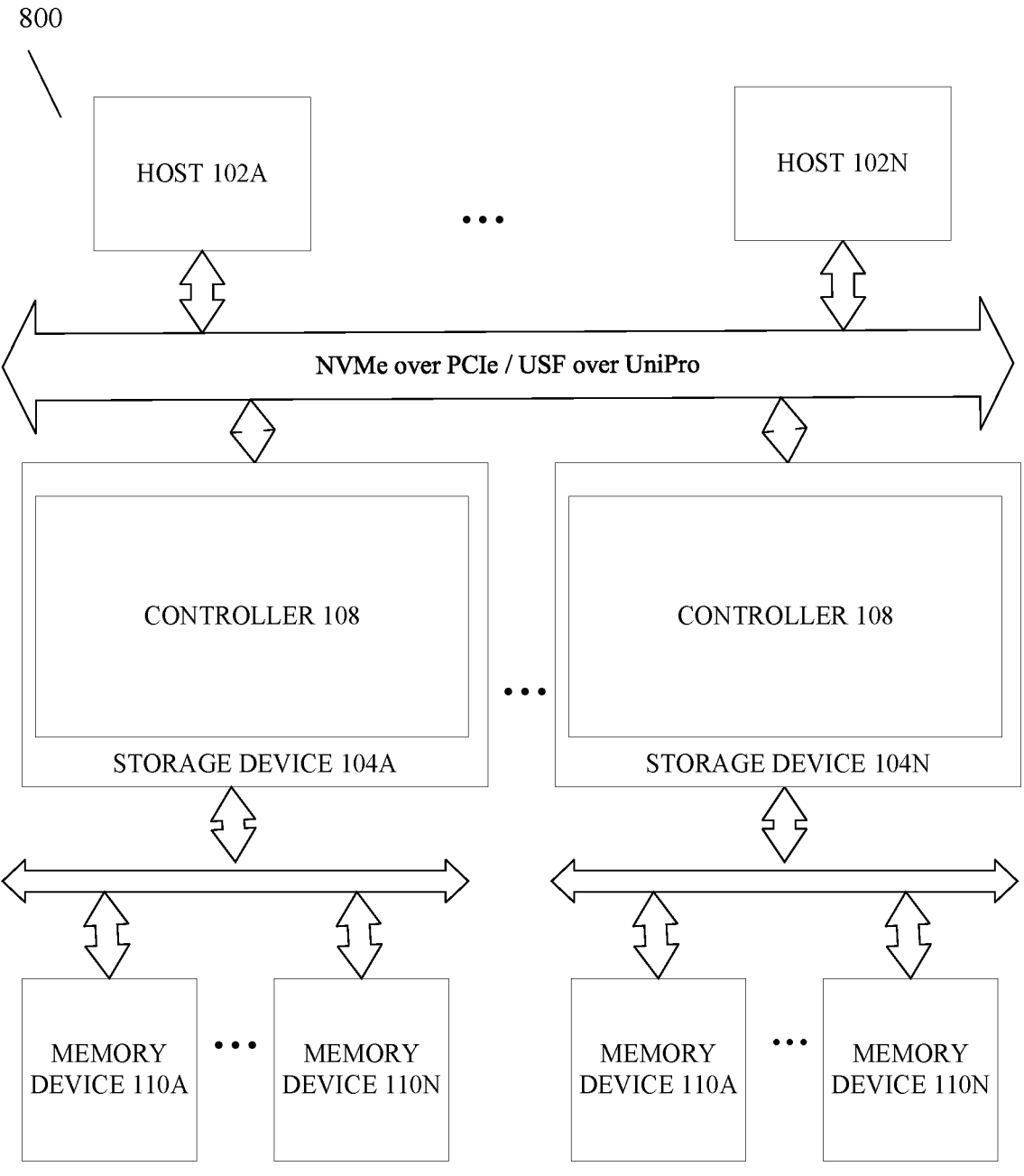
FIG. 8 is a diagram of an example environment in which systems and/or methods described herein are implemented.

FIG. 8 is a diagram of an example environment in which systems and/or methods described herein are implemented. As shown in FIG. 8, Environment 800 may include hosts 102-102*n* (referred to herein as host(s) 102), and storage devices 104*a*-104*n* (referred to herein as storage device(s) 104).

Storage device 104 may include a controller 108 to manage the resources on storage device 104. Controller 108 may improve the performance of storage device 104 by using unused bits in planes in memory device 110 for relocation operations. Hosts 102 and storage devices 104 may communicate via Non-Volatile Memory Express (NVMe) over peripheral component interconnect express (PCI Express or PCIe) standard, the Universal Flash Storage (UFS) over Unipro, or the like.

Devices of Environment 800 may interconnect via wired connections, wireless connections, or a combination of wired and wireless connections. For example, the network of FIG. 8 may include a cellular network (e.g., a long-term evolution (LTE) network, a code division multiple access (CDMA) network, a 3G network, a 4G network, a 5G network, another type of next-generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 8 are provided as an example. In practice, there may be additional devices and/or networks, fewer devices and/or networks, different devices and/or networks, or differently arranged devices and/or networks than those shown in FIG. 8. Furthermore, two or more devices shown in FIG. 8 may be implemented within a single device, or a single device shown in FIG. 8 may be implemented as multiple, distributed devices. Additionally, or alternatively, a set of devices (e.g., one or more devices) of Environment 800 may perform one or more functions described as being performed by another set of devices of Environment 800.

Figure 9:
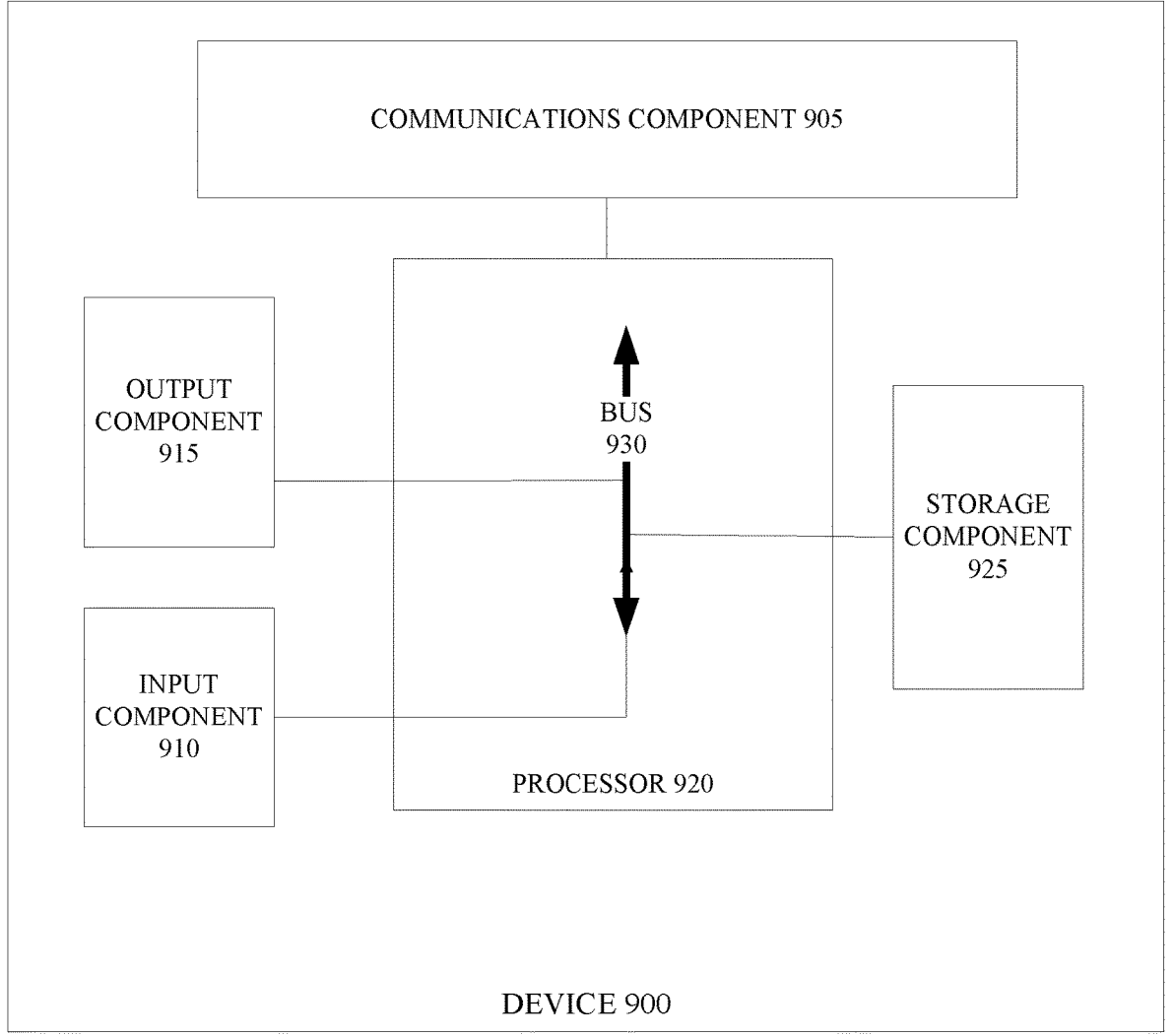
FIG. 9 is a diagram of example components of the host of FIG. 1.

FIG. 9 is a diagram of example components of one or more devices of FIG. 1. In some implementations, host 102 may include one or more devices 900 and/or one or more components of device 900. Device 900 may include, for example, a communications component 905, an input component 910, an output component 915, a processor 920, a storage component 925, and a bus 930. Bus 930 may include components that enable communication among multiple components of device 900, wherein components of device 900 may be coupled to be in communication with other components of device 900 via bus 930.

Input component 910 may include components that permit device 900 to receive information via user input (e.g., keypad, a keyboard, a mouse, a pointing device, a microphone, and/or a display screen), and/or components that permit device 900 to determine the location or other sensor information (e.g., an accelerometer, a gyroscope, an actuator, another type of positional or environmental sensor). Output component 915 may include components that provide output information from device 900 (e.g., a speaker, display screen, and/or the like). Input component 910 and output component 915 may also be coupled to be in communication with processor 920.

Processor 920 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 920 may include one or more processors capable of being programmed to perform a function. Processor 920 may be implemented in hardware, firmware, and/or a combination of hardware and software.

Storage component 925 may include one or more memory devices, such as random-access memory (RAM) 114, read-only memory (ROM), and/or another type of dynamic or static storage device (e.g., a flash memory, a magnetic memory, and/or optical memory) that stores information and/or instructions for use by processor 920. A memory device may include memory space within a single physical storage device or memory space spread across multiple physical storage devices. Storage component 925 may also store information and/or software related to the operation and use of device 900. For example, storage component 925 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Communications component 905 may include a transceiver-like component that enables device 900 to communicate with other devices, such as via a wired connection, a wireless connection, or a combination of wired and wireless connections. The communications component 905 may permit device 900 to receive information from another device and/or provide information to another device. For example, communications component 905 may include an Ethernet interface, an optical interface, a coaxial interface, an infrared interface, a radio frequency (RF) interface, a universal serial bus (USB) interface, a Wi-Fi interface, and/or a cellular network interface that may be configurable to communicate with network components, and other user equipment within its communication range. Communications component 905 may also include one or more broadband and/or narrowband transceivers and/or other similar types of wireless transceiver configurable to communicate via a wireless network for infrastructure communications. Communications component 905 may also include one or more local area network or personal area network transceivers, such as a Wi-Fi transceiver or a Bluetooth transceiver.

Device 900 may perform one or more processes described herein. For example, device 900 may perform these processes based on processor 920 executing software instructions stored by a non-transitory computer-readable medium, such as storage component 925. As used herein, the term "computer-readable medium" refers to a non-transitory memory device. Software instructions may be read into storage component 925 from another computer-readable medium or from another device via communications component 905. When executed, software instructions stored in storage component 925 may cause processor 920 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 9 are provided as an example. In practice, device 900 may include additional components, fewer components, different components, or differently arranged components than those shown in FIG. 9. Additionally, or alternatively, a set of components (e.g., one or more components) of device 900 may perform one or more functions described as being performed by another set of components of device 900.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related items, unrelated items, and/or the like), and may be used interchangeably with "one or more." The term "only one" or similar language is used where only one item is intended. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation, the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

We claim:

1. A storage device to reduce resource usage and time on the storage device during background operations, the storage device being communicatively coupled to a host device that reads data from and writes data to a memory device communicatively coupled to the storage device, the storage device comprises:

a memory device including a plane having a redundant column section and an associated payload section divided into units, the redundant column section including unused bits wherein an unused bit is associated with a unit in the payload section; and a controller to receive instructions from the host device and determine that the instructions are associated with data to be discarded from the memory device and associate the data to be discarded with fragments in the memory device;

generate relocation information for the unit in the payload section, associate the relocation information with data stored in the memory device in the payload section, and store the relocation information in the unused bit for the unit in the redundant column section, wherein the relocation information includes a first value that is associated with the fragments to be discarded and a second value that is associated with data to be relocated during background operations;

use a value in the unused bit to determine when data in an associated payload section is to be discarded and when data in the associated payload section is to be relocated during the background operation; and aggregate data having the second value in an associated unused bit for relocation during the background operation.

2. The storage device of claim 1, wherein the instructions include instructions to rewrite host data in the memory device.

3. The storage device of claim 1, wherein the instructions include a command to preemptively notify the storage device when data in a particular block in the memory device becomes invalid and is to be discarded, the command including a logical block address associated with the data to be discarded.

4. The storage device of claim 3, wherein the controller determines a corresponding physical block in the memory device for the logical block address and maintains a database with entries within a block in the memory device that includes the data to be discarded.

5. The storage device of claim 1, wherein the relocation information includes a validity bitmap and the controller sets bits in the validity bitmap for fragments in the memory device with the data to be discarded to the first value and sets bits in the validity bitmap for fragments in the memory device with data to be relocated to the second value.

6. The storage device of claim 5, wherein the controller checks a value of a bit in the validity bitmap to determine whether a fragment of data in the memory device associated with the bit is to be moved during the relocation operation.

7. The storage device of claim 1, wherein the relocation information includes a hot data flag wherein the controller uses the hot data flag to determine how to process associated data during the relocation operation.

8. The storage device of claim 7, wherein the controller one of maintains data associated with the hot data flag in a current location during the relocation operation and moves the data associated with the hot data flag to another block including a same number of bits per cell.

9. The storage device of claim 1, wherein the relocation information includes a bios data bit and the controller uses the bios data bit to determine how to process associated data during the relocation operation.

10. The storage device of claim 1, wherein the controller writes the relocation information to the redundant column section using one of a Golay code, data and data-bar pairs with a cyclic redundancy code, and a Triple Module Redundancy code with a cyclic redundancy code mechanism.

11. A method for reducing resource usage and time on a storage device when executing background operations on the storage device, the method including:

receiving instructions from a host device by the storage device;

determining, by a processor in the storage device, that the instructions are associated with data to be discarded from a memory device communicatively coupled to the storage device, wherein the memory device includes a plane having a redundant column section and an associated payload section divided into units, the redundant column section including unused bits wherein an unused bit is associated with a unit in the payload section;

associating, by the processor, the data to be discarded with fragments in the memory device;

generating, by the processor, relocation information for the unit in the payload section and associating the relocation information with data stored in the memory device in the payload section, wherein the relocation information includes a first value that is associated with the fragments to be discarded and a second value that is associated with data to be relocated during background operations;

storing, by the processor, the relocation information in the unused bit for the unit in the redundant column section;

using, by the processor, a value in the unused bit to determine when data in an associated payload section is to be discarded and when data in the associated payload section is to be relocated during the background operation; and aggregating data having the second value in an associated unused bit for relocation during the background operation.

12. The method of claim 11, wherein the receiving comprises one of receiving instructions to rewrite host data in the memory device and receiving a command to preemptively notify the storage device when data in a particular block in the memory device becomes invalid and is to be discarded, the command including a logical block address associated with the data to be discarded.

13. The method of claim 12, wherein the determining comprises determining a corresponding physical block in the memory device for the logical block address and maintaining a database with entries within a block in the memory device that includes the data to be discarded.

14. The method of claim 11, wherein the generating comprises generating a validity bitmap setting bits in the validity bitmap for fragments in the memory device with the data to be discarded to the first value and setting bits in the validity bitmap for fragments in the memory device with data to be relocated to the second value.

15. The method of claim 14, wherein the using comprises checking a value of a bit in the validity bitmap to determine whether a fragment of data in the memory device associated with the bit is to be moved during the relocation operation.

16. The method of claim 11, wherein the generating comprises generating a hot data flag, using the hot data flag to determine how to process associated data during the relocation operation, and one of maintaining data associated with the hot data flag in a current location during the relocation operation and moving the data associated with the hot data flag to another block including a same number of bits per cell.

17. The method of claim 11, wherein the generating comprises generating a bios data bit, using the bios data bit to determine how to process associated data during the relocation operation, and one of maintaining data associated with the bios data bit in a current location during the relocation operation and moving the data associated with the bios data bit to another block including a same number of bits per cell.

18. The method of claim 11, further comprising writing the relocation information to the redundant column section using one of a Golay code, data and data-bar pairs with a cyclic redundancy code, and a Triple Module Redundancy code with a cyclic redundancy code mechanism.

19. A storage device communicatively coupled to a host device, the host device reads data from and writes data to a memory device communicatively coupled to the storage device, the storage device comprises:

a memory device including a plane having a redundant column section and an associated payload section divided into units, the redundant column section including bits for use as replacement bits in the plane, wherein remaining bits not used as replacement bits are used for background operations on the storage device and a replacement bit is associated with a unit in the payload section; and a controller to receive instructions from the host device and determine that the instructions are associated with data to be discarded from the memory device and associate the data to be discarded with fragments in the memory device;

generate relocation information for the unit in the payload section, associate the relocation information with data stored in the memory device in the payload section, and store the relocation information in the replacement bit associated with the unit in the redundant column section, wherein the relocation information includes a first value that is associated with the fragments to be discarded, a second value that is associated with data to be relocated during background operations, and a retention bit to indicate how to process associated data during a relocation operation;

use a value in the unused bit to determine when data in an associated payload section is to be discarded and when data in the associated payload section is to be relocated during background operation;

aggregate data having the second value in an associated replacement bit for relocation during the background operation; and one of maintain data having the retention bit in a current location during the relocation operation and move the data having the retention bit to another block including a same number of bits per cell.

20. The storage device of claim 19, wherein the controller generates types of the relocation information based on a number of the remaining bits.

* * * * *